H. DUMARS.
APPARATUS FOR PRODUCING OZONE AND SEPARATING GASES.
APPLICATION FILED AUG. 26, 1913.

1,149,254.

Patented Aug. 10, 1915.
2 SHEETS—SHEET 1.

WITNESSES:

H. Dumars INVENTOR

BY John D. Morgan
ATTORNEY

H. DUMARS.
APPARATUS FOR PRODUCING OZONE AND SEPARATING GASES.
APPLICATION FILED AUG. 26, 1913.

1,149,254.

Patented Aug. 10, 1915.

2 SHEETS—SHEET 2.

WITNESSES:

H. Dumars INVENTOR

John D. Morgan
ATTORNEY

UNITED STATES PATENT OFFICE.

HORACE DUMARS, OF GLEN RIDGE, NEW JERSEY.

APPARATUS FOR PRODUCING OZONE AND SEPARATING GASES.

1,149,254.      Specification of Letters Patent.      Patented Aug. 10, 1915.

Original application filed February 28. 1912, Serial No. 680,476. Divided and this application filed August 26, 1913. Serial No. 786,695.

*To all whom it may concern:*

Be it known that I, HORACE DUMARS, a citizen of the United States, and a resident of Glen Ridge, in the county of Essex and State of New Jersey, have invented certain new and useful Improvements in Apparatus for Producing Ozone and Separating Gases, of which the following is a specification.

The invention relates to means for the production of ozone, and in certain aspects thereof more especially to means for the production of ozone in liquid form from the atmosphere.

The invention relates also to means or instrumentalities for the separation of the atmospheric gases from each other.

The objects of the invention will in part be set forth hereinafter and will in part be obvious herefrom to those skilled in the art without setting forth in detail.

The invention consists in the novel improvements, combinations, instrumentalities and apparatus herein shown and described.

This application is a division of my application Ser. No. 680,476 filed February 28, 1912, which has eventuated in Patent No. 1,074,106.

The accompanying drawings, referred to herein and forming a part hereof, illustrate a device or apparatus constructed in accordance with the principles of the invention.

Figure 1:
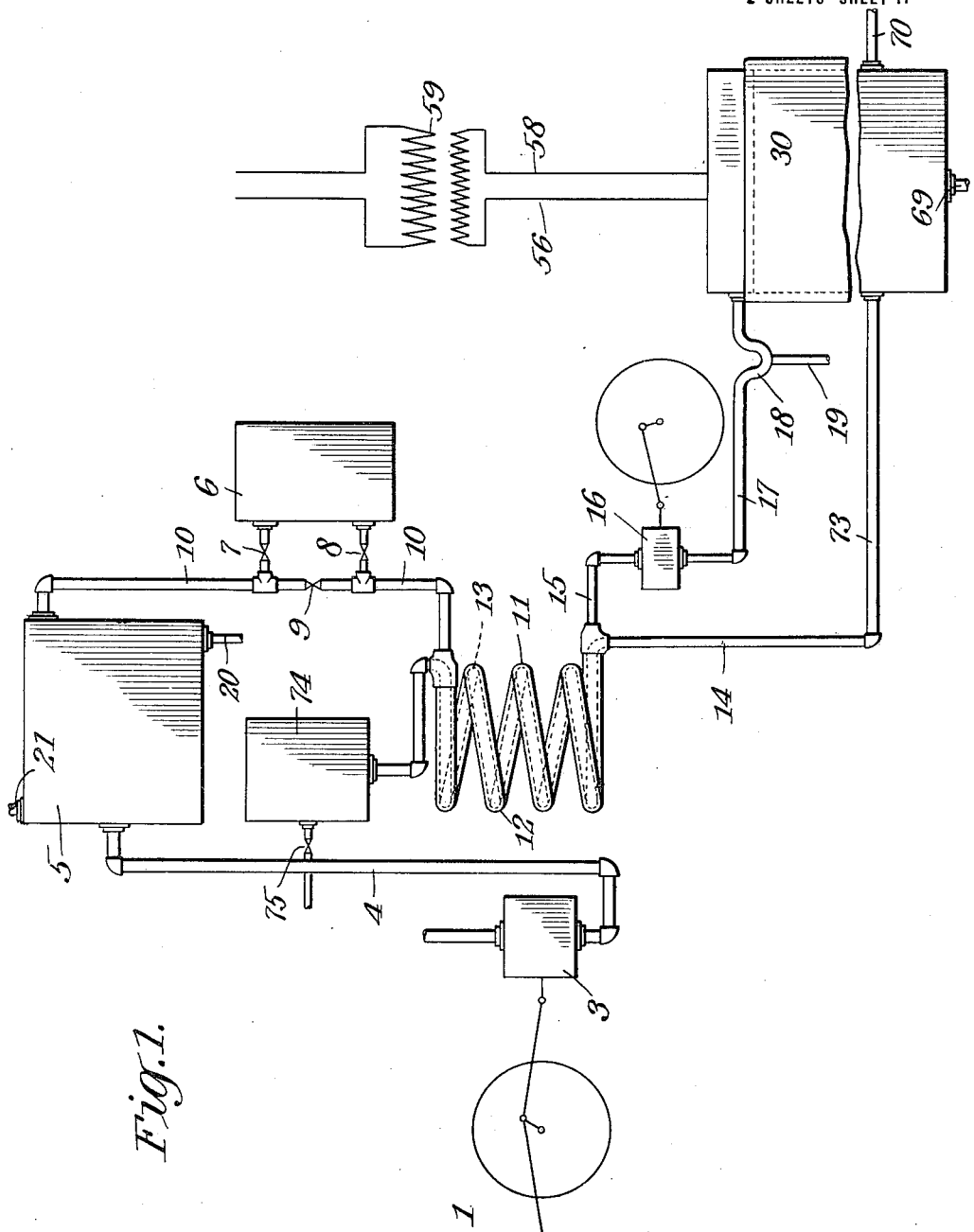
Figure 2:
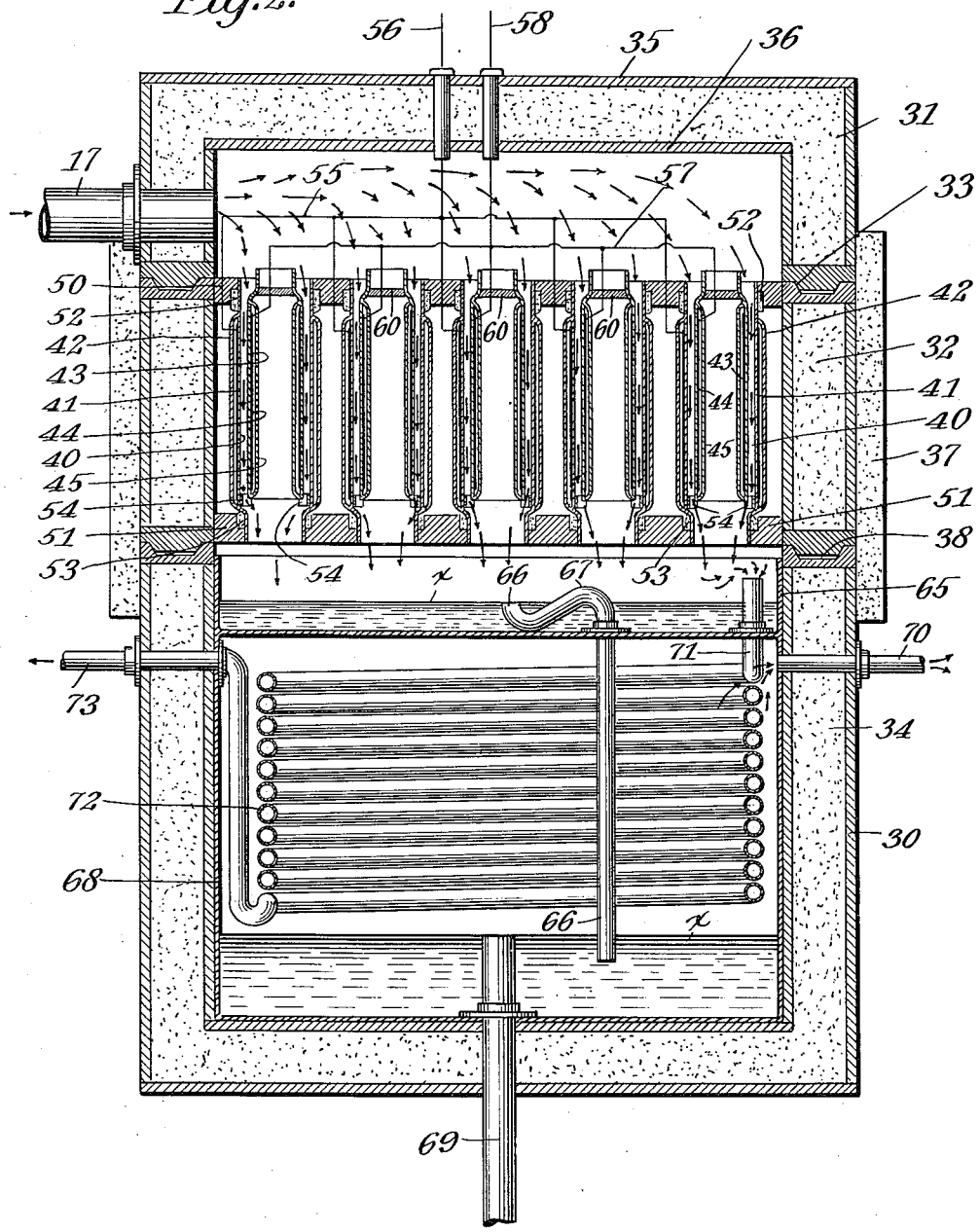

Of the drawings: Figure 1 is an elevation partly diagrammatic in character, of an apparatus embodying the principles of the invention; Fig. 2 is a sectional view, on an enlarged scale, of what may be termed for convenience the ozonizer proper or separator (shown in fragmentary elevation at the lower right hand corner of Fig. 1).

Referring by way of example to the accompanying drawings, which illustrate one embodiment of the invention, and pointing out the various parts thereof by suitable reference numerals, means are shown for compressing air, said means being indicated generally by the reference numeral 1. The engine is shown conventionally and designated as 2, while the compressor proper is designated as 3. A conduit 4 conducts away the compressed air, and if desired a suitable storage receptacle 5 may be provided for the compressed air. This receptacle 5 may be utilized also to remove a large part of the heat of compression by radiating it to the surrounding atmosphere, or, if desired, by having a cooling liquid supplied to a surrounding jacket by suitable pipes 21 and 20.

Suitable drying means may also be provided, of convenient and approved form, and I have indicated same conventionally at 6. Ingress to the drier is controlled by a valve 7 and egress therefrom by a valve 8. A suitable by-pass valve 9 is shown in the conduit 10, which conduit serves to convey the compressed air away from the storage receptacle 5. The drier 6, as previously stated, may be of any adequate and approved construction, and a carbon dioxid drier, acting to chill the air and thus reducing its vapor-bearing capacity, will usually be found suitable and adequate, although the particular form of drier used is immaterial so far as concerns many features of the invention.

According to one feature of the invention, a counter-cooler or temperature exchanging means 11 is employed to reduce the temperature of the air, and in accordance with one feature of the invention this is effectuated by running through one of the coils the nitrogen or one or more of the low temperature gases, obtained from the air by or after the conversion of its oxygen into ozone, and the separation thereby of the gases. In the embodied form of apparatus, the lower portion of the conduit 10 opens into or communicates with a helically arranged pipe 12 of larger bore. Within this pipe 12 is arranged another helically arranged pipe 13 to which is supplied through a pipe 14, nitrogen or other liquid or gas at exceedingly low temperature. The pipe 14 communicates with the pipe 73 and receives therefrom the cold nitrogen as hereinafter explained.

In the illustrated apparatus, the now cooled and dry air, still under pressure, emerges from the counter-cooler 11 into the conduit 15. The invention, in one of its aspects, provides means for reducing the air pressure to normal atmospheric pressure or but little above atmospheric pressure, and for carrying it through the ozonizer or separating device. The various compressing, drying and cooling agencies or instrumentalities are so arranged and regulated that the air will be delivered to the ozonizer thoroughly dry and at sufficient pressure to carry it through the ozonizer, and it will be at a temperature below the liquefying temperature of ozone and above the liquefying temperature of oxygen and nitrogen.

In the embodied form of apparatus the pressure reducing instrumentality illustrated comprises an expansion engine 16, the expanded air, much reduced in temperature by its expansion, passes through a conduit 17 into the ozonizer to have the oxygen of the air converted into ozone and liquefied. Certain of the atmospheric gases can be removed in any suitable manner, as by reducing the temperature of the air below the liquefying point for such gases before the air enters the ozonizer, as for instance the carbon-dioxid may be so removed. A trap 18 is shown in conduit 17, provided with a suitable drain 19, through which the liquid may be drawn off. Other means of removing gases may be provided, whereby the residual gas after the ozonizing of the oxygen may be pure or substantially pure nitrogen.

The embodied form of ozonizer comprises an outer casing 30, conveniently and preferably built in sections. Said casing is shown of general rectangular form, and having an upper section 31 into which the cold dry air from the conduit 17 is discharged and directed toward the ozonizing devices. The section 32 is shown carrying the ozonizing devices, which will be later described in detail. The two sections 31 and 32 are connected by an airtight joint 33 which may be of suitable resilient and acid-resistant material. The section 34 of the ozonizer constitutes in the present embodiment the bottom portion into which the liquefied ozone is received, and also the other gases of the atmosphere are collected therein, and are then carried away therefrom. The parts 32 and 34 are united by a tight joint 38 which may be generally similar to 33. To more thoroughly and perfectly seal the device against air leakage and temperature changes, an additional jacket of impervious and preferably non-conducting material 37 is placed about the joints 33 and 38.

The ozonizer is of non-conducting material and construction, and may consist of inner and outer casings 35 and 36 which may be of wood, porcelain or other suitable material, and such material may have protective facings on the interior of the ozonizer wherever needed. Between said casings may be a suitable non-conducting material of any approved kind, such as felt or other non-conducting material.

The ozonizers are preferably arranged in rows or series in suitable heads or mountings 50 and 51 carried by the section 32 of the casing. One such row of ozonizers is shown in longitudinal section in Fig. 2 of the drawings, and the arrangement and construction of the ozonizers will be understood from a description of one of said ozonizers. The embodied form of ozonizer is preferably of tubular form and comprises a series of pairs of nesting, or inclosed and inclosing tubes, as will now be described in detail. For convenience in description, the tubes outside of the air passage may be termed outside tubes and those inside the air passage inside tubes.

Means are provided for protecting the electrodes from action by the gases. In the embodied form of such means the outside tubes are shown of double form, the electrode, or current or charge carrying surface being inclosed or protected from the action of the gases, some of which might prove highly detrimental or destructive. As embodied, a cylinder of glass or other suitable dielectric material 40 is provided, and on the exterior surface thereof a coating of charge carrying material 41, such as a coating of foil or finely comminuted conducting metal held by a suitable binder and drier. The tube or cylinder 40 is inclosed by a cylinder 42, their edges abutting or joining together to hermetically seal the intervening space, and the coating 41 contained therein. The inside tubes 43, likewise of suitable dielectric material, carry on their inside a coating 44 of charge or current accumulating material, such as has already been described in connection with the outside tubes. A second inner tube 45 is likewise provided, with its edges abutting with the inside tube 43 to hermetically seal the inclosed coating 44 to protect it from the destructive action of the gases.

The outer tubes are mounted in openings in the heads 50 and 51, and may be held in position by rings or gaskets 52 and 53 of resilient material which serves to hold them firmly in position and to make a tight joint. The inner tubes are supported upon holding and spacing members 54 of fiber or other suitable material, said members having their lower edges resting against the inner wall of the outside tube and receiving the lower edge of the inside tube upon shoulders formed in said members. Said members hold the respective outside and inside tubes spaced away from each other to give the requisite air passage between the inside and outside tubes. The outer coatings 41 are connected by a wire 55 to a trunk or bus wire 56. The inner coatings are connected by a wire 57 to the trunk or bus wire 58. These wires 56 and 58 are shown leading to a transformer 59, which is supplied with current from a suitable source of energy. Means are provided for directing or causing the air to pass between the inside and outside tubes of the various ozonizers, and for this purpose, in the illustrated embodiment, the inner tubes are closed, respectively, by disks 60.

The manner of operation of the apparatus described and illustrated is substantially as follows: Said apparatus is employed to reduce air to a temperature lower than that at which ozone liquefies, and at such temperature to change the oxygen of the air into ozone, and owing to the fact that the temperature is below the liquefying temperature of ozone at the pressure prevailing, the ozone at once changes to the liquid state as soon as it is produced, which process is described in my application Ser. No. 680,476, hereinbefore referred to. I preferably produce the ozone at ordinary atmospheric pressure, the temperature being maintained at a point below the liquefying point (that is, the temperature at which it changes from gaseous to liquid form) for the ozone but above the liquefying point for either oxygen or nitrogen. The liquefying temperature, or point of liquefaction of ozone at atmospheric pressure is approximately $-106°$ C., while oxygen liquefies at approximately $-170°$ C, and nitrogen liquefies at approximately $-106°$ C. Preferably the temperature is kept as far as practicable above the liquefying temperature of the oxygen, and the nitrogen is flowed off and utilized for the cooling and afterward utilized for other purposes. The compresser 1 compresses the air, which is conveyed by the conduit 4 to the storage tank 5, where it receives its preliminary cooling. The now partially cooled air passes along the conduit 10 and through the drier 6 where its moisture is extracted. It then passes through the counter-cooler 11 where its temperature is greatly reduced, and then through conduit 15 passes on to the expanding means such as the engine 16. It is here expanded to substantially atmospheric pressure again and is consequently greatly reduced in temperature, and is brought to a predetermined temperature, or approximately so, which temperature is below the liquefaction point of ozone, and above the liquefaction point of oxygen and of nitrogen. The air passes through the conduit 17 into the upper portion of the ozonizer 30, as indicated by the small arrows in Fig. 2. The air then passes through the ozonizers where the oxygen is converted into ozone and the ozone is changed into liquid form.

It will be understood with reference to the ozonizers that the coatings 41 and 44 are under a high difference of potential, and there is consequently an electrical effluence, or a field of such effluence between the opposite surfaces of the dielectrics, that is, the walls of the inside and outside tubes, and across the passage through which the air flows as indicated by the small arrows in Fig. 2. By reason of the temperature, the ozone, when formed by the action of the electrical effluence on the oxygen of the air, is changed into liquid form, as already described.

Means are provided whereby the liquefied ozone is collected and carried away, and the nitrogen and certain other gases of the air, being still in gaseous form, are gathered and separately conveyed away. In the present or embodied form of apparatus there is provided at the upper end of the part 34 of the ozonizer 30 a pan or receptacle 65 of vitreous or other acid-resistant material in which the liquid ozone (indicated by $x$ in Fig. 2) is gathered. The liquid ozone is conveyed away through a pipe 66, which pipe may be trapped as shown at 67, to a chamber 68 in the lower part of 34. This chamber will likewise be lined with vitreous or other acid-resistant material. Should there be any gasifying of the ozone in the chamber 68, it may be conveyed away through the pipe 70, and thereby avoid back pressure in the chamber 68 and possibly interference with the working of the apparatus. The nitrogen and certain other gases are separated or conveyed away from the receptacle 65 through a pipe 71. The pipe 71 is shown extending into a coil 72 occupying a large portion of the chamber 68, and acting to keep the liquid ozone in said chamber cool. The coil 72 communicates with a pipe 73 for conveying away the cold gases. These gases are used in the counter-cooler 11, and for this purpose the pipe 73 communicates with the pipe 14. The nitrogen and other separated gases may be disposed of in any suitable or desirable manner, and in the illustrated apparatus a collecting chamber 74 is provided from which the gases may be drawn as desired, exit of the gas being controlled by a valve 75.

Should it be desirable to remove certain or any of the gases constituting the air prior to the ozonizing of the oxygen, this may be done in any suitable manner as found convenient or expedient. It will be understood from the foregoing that the gases of the air in passing through and in being operated upon by the apparatus have been separated from each other by liquefying one gas and retaining another in gaseous form, and conducting apart and thus separating said gas and liquid. Further, it will be understood that with respect to the liquefied gas its change to the liquid state has been effected by electrical action upon the air currents, and more particularly by electrical effluence. Also, it will be noted that one of the gases of the air was subjected to a change in its molecular constitution, that is, the atomicity of its molecule was changed, and in the particular instance this occurred in the case of the liquefied gas; also, a great change in the temperature of liquefaction was effected by the change in the molecular constitution of the gas, that is, by the change from oxygen ($O_2$) to ozone ($O_3$), and the different gases conducted away from each other and the action or process continued as the air flows through the devices and the separated products are conducted away.

Other advantages will be obvious from this specification, and it will be understood that variations may be made from the steps and apparatus shown and described within the scope of the accompanying claims.

What I do claim as my invention and desire to secure by Letters Patent, is:

1. An apparatus of the kind described including in combination means for reducing the temperature of air below the liquefying temperature for ozone, and an electrical effluence device, means for flowing said air through said device, and means for separately collecting the liquefied ozone and the gaseous nitrogen.

2. An apparatus of the kind described including in combination means for reducing the temperature of air below the liquefying temperature for ozone, an electrical effluence device, means for flowing said air through said device, means for separately collecting the liquefied ozone and the gaseous nitrogen, and means for utilizing said separated nitrogen in reducing the temperature of said air current.

3. An apparatus of the kind described including in combination means for reducing the temperature of air below the liquefying temperature for ozone, means for drying the air, an electrical effluence device, means for flowing said air through said device, and means for separately collecting the liquefied ozone and the gaseous nitrogen.

4. An apparatus of the kind described including in combination means for reducing the temperature of air below the liquefying temperature for ozone, an electrical effluence device, means for flowing said air through said device, means for separately collecting the liquefied ozone and the gaseous nitrogen, and means for utilizing said separated nitrogen in keeping the liquid ozone cold.

5. An apparatus of the kind described, including in combination means for reducing the temperature of air below the liquefying temperature for ozone, an electrical effluence device, means for flowing said air through said device, means for separately collecting the liquefied ozone and the gaseous nitrogen, means for utilizing said separated nitrogen in keeping the liquid ozone cold, and means for utilizing said separated nitrogen in reducing the temperature of said air current.

6. An apparatus of the kind described including in combination means for reducing the temperature of air below the liquefying temperature for ozone, means for drying the air, an electrical effluence device, means for flowing said air through said device, and means for separately collecting the liquefied ozone and the gaseous nitrogen, means for utilizing said separated nitrogen in keeping the liquid ozone cold, and means for utilizing said separated nitrogen in reducing the temperature of said air current.

7. An apparatus of the kind described including in combination means for reducing the temperature of air below the liquefying temperature for ozone, and a plurality of electrical effluence devices, means for flowing said air through said plurality of devices, and means for separately collecting the liquefied ozone and the gaseous nitrogen.

8. An apparatus of the kind described including in combination means for reducing the temperature of air below the liquefying temperature of ozone, an electrical effluence device comprising a charge accumulating coating, means for flowing said air through said device and means for sealing said coating from said air current.

9. An apparatus of the kind described including in combination means for directing a current of air through said apparatus, means coöperating to reduce the air to liquid ozone and gaseous nitrogen, said reducing means including an electrical effluence device, and means for utilizing the gaseous nitrogen to keep cold the liquid ozone.

10. An apparatus of the kind described including in combination means for reducing air to a temperature below the liquefying point of ozone, electrical effluence means, means for flowing said air in thin streams through said field of electrical effluence, and means for separating the liquid ozone and the gaseous nitrogen.

11. An apparatus of the kind described including in combination means for reducing the temperature of air below the liquefying temperature for ozone, an electrical effluence device, means for flowing said air through said device, a closed chamber in which the liquid ozone is collected, and a coil within said chamber through which the gaseous nitrogen flows.

12. An apparatus of the kind described including in combination electrical effluence means, means for directing air through the field of effluence at substantially normal atmospheric pressure and at a temperature below the liquefying temperature of ozone and above the liquefying temperature of oxygen and means for separating the liquid ozone and gaseous nitrogen.

13. An apparatus of the kind described including in combination electrical effluence means, including devices for separating the air into thin streams, means for directing air through the field of effluence at substantially normal atmospheric pressure and at a temperature below the liquefying temperature of ozone and above the liquefying temperature of oxygen and means for separating the liquid ozone and gaseous nitrogen.

14. An apparatus of the kind described including in combination a closed chamber, electrical effluence devices therein, means for supplying a current of air to said devices at a temperature below the liquefying point of ozone and above the liquefying point of nitrogen, and means for collecting the liquid ozone, and means for collecting and conducting away the gaseous nitrogen.

15. An apparatus of the kind described including in combination a closed chamber, electrical effluence devices therein, means for supplying a current of air to said devices at a temperature below the liquefying point of ozone and above the liquefying point of nitrogen, and a receptacle for the liquid ozone and a coil for conveying away the liquid nitrogen through said receptacle.

16. An apparatus for producing liquid ozone which comprises means for compressing air, means for cooling compressed air, means for expanding the compressed cooled air below the liquefying temperature of ozone, means for subjecting the cooled and expanded air to the action of electrical effluence, and means for collecting the liquid ozone.

17. An apparatus for producing liquid ozone which comprises means for compressing air, means for cooling compressed air, means for expanding the compressed air below the liquefying temperature of ozone, means for subjecting the cooled and expanded air to the action of electrical effluence, means for collecting the liquid ozone, and means for collecting the gaseous nitrogen.

In testimony whereof, I have signed my name to this specification, in the presence of two subscribing witnesses.

HORACE DUMARS.

Witnesses:
   JOHN D. MORGAN,
   ROSE MENK.